United States Patent
Locker et al.

(10) Patent No.: US 9,058,229 B2
(45) Date of Patent: *Jun. 16, 2015

(54) METHOD AND APPARATUS FOR MAINTAINING OPERABILITY WITH A CLOUD COMPUTING ENVIRONMENT

(75) Inventors: Howard J. Locker, Cary, NC (US); Richard Wayne Cheston, Morrisville, NC (US); Rod D. Waltermann, Rougemont, NC (US); Goran H. Wibran, Cary, NC (US)

(73) Assignee: Lenovo (Singapore) PTE. LTD., Tech Park (SG)

(*) Notice: Subject to any disclaimer, the term of this patent is extended or adjusted under 35 U.S.C. 154(b) by 366 days.

This patent is subject to a terminal disclaimer.

(21) Appl. No.: 12/897,549

(22) Filed: Oct. 4, 2010

(65) Prior Publication Data

US 2012/0084355 A1     Apr. 5, 2012

(51) Int. Cl.
    *G06F 15/173*     (2006.01)
    *G06F 9/445*     (2006.01)

(52) U.S. Cl.
    CPC ........................... *G06F 8/60* (2013.01)

(58) Field of Classification Search
None
See application file for complete search history.

(56) References Cited

U.S. PATENT DOCUMENTS

| | | | |
|---|---|---|---|
| 2002/0169777 A1* | 11/2002 | Balajel et al. | 707/10 |
| 2006/0112398 A1* | 5/2006 | Mukkamala et al. | 719/316 |
| 2011/0119364 A1* | 5/2011 | Zarkesh | 709/223 |

* cited by examiner

*Primary Examiner* — Scott B Christensen
(74) *Attorney, Agent, or Firm* — Kunzler Law Group (57) ABSTRACT

A method and apparatus for maintaining operability with a cloud computing environment. The apparatus includes a storage module and a local environment module. The storage module may store cloud computing data from a cloud computing environment onto a local storage device. The storage module may communicate with the cloud computing environment through a remote connection. The local environment module may operate a local cloud computing environment from the local storage device while the remote connection to the cloud computing environment is unavailable. The local cloud environment may replicate at least a portion of the cloud computing environment and may be operated from the stored cloud computing data.

13 Claims, 8 Drawing Sheets

METHOD AND APPARATUS FOR MAINTAINING OPERABILITY WITH A CLOUD COMPUTING ENVIRONMENT

BACKGROUND

1. Field

The subject matter disclosed herein relates to a cloud computing environment and more particularly relates to maintaining operability with a cloud computing environment.

2. Description of the Related Art

The use of cloud computing continues to increase. Cloud computing involves remote computing over a network where applications, documents, and data are provided by remote computers over the network to a cloud computing access device. A user typically logs-in to a cloud computing environment from the user's local computer. The user is then able to access applications, documents, and data on the cloud computing environment. Because the remote computer stores and operates the cloud computing environment, when a connection to the remote computers become unavailable, the user is unable to access, modify, and/or save the user's documents, applications, and data.

SUMMARY

From the foregoing discussion, inventors herein have identified a need for a method and apparatus that stores cloud computing data from a cloud computing environment onto a local storage device. Beneficially, such a method and apparatus would maintain operability with the cloud computing environment while the remote connection to the cloud computing environment is unavailable.

The embodiments of the present disclosure have been developed in response to the present state of the art, and in particular, in response to the problems and needs in the art that have not yet been fully solved by currently available cloud computing access devices. Accordingly, the embodiments have been developed to provide a method and apparatus for maintaining operability with a cloud computing environment that overcome many or all of the above-discussed shortcomings in the art.

One embodiment of the apparatus includes a storage module and a local environment module. The storage module stores cloud computing data from a cloud computing environment onto a local storage device. The storage module may communicate with the cloud computing environment through a remote connection. The local environment module operates a local cloud computing environment from the local storage device while the remote connection to the cloud computing environment is unavailable. The local cloud environment may replicate at least a portion of the cloud computing environment and may be operated from the stored cloud computing data.

In a further embodiment, at least a portion of the local storage device includes a removable storage device. In one embodiment, the apparatus further includes a connection module checking for data connectivity of the remote connection at a predetermined interval. In a further embodiment, the connection module detects data connectivity of the remote connection and the apparatus further includes a synchronization module synchronizing differences of the cloud computing environment and/or the local cloud computing environment in response to the connection module detecting data connectivity of the remote connection.

In one embodiment, the apparatus further includes a state module maintaining a state of the cloud computing environment and/or the local cloud computing environment. The state may include a cloud computing environment version indicator, an application version indicator, and/or a document version indicator of one or more of the cloud computing environment and the local cloud computing environment.

In one embodiment, the apparatus further includes a state comparison module comparing a state of the cloud computing environment with a state of the local cloud computing environment to determine differences between the cloud computing environment and the local cloud computing environment. In certain embodiments, the storage module maintains a secure storage area on the local storage device. The storage module may secure store at least a portion of the cloud computing data on the secure storage area. Furthermore, a particular portion of the at least a portion of the cloud computing data may be accessible by a user with a security credential corresponding to the particular portion.

In certain embodiments, the cloud computing environment includes a cloud computing application, a cloud computing document, and/or one or more cloud computing security credentials.

A method is presented for maintaining operability with a cloud computing environment. In one embodiment, the method includes the steps to carry out the functions of the apparatus.

A computer program product is also presented for maintaining operability with a cloud computing environment, also with similar steps to carry out the functions of the apparatus. Additionally, in one embodiment, the computer program product includes providing the cloud computing environment with a cloud computing security credential corresponding to a user, the cloud computing environment allowing communication between the local storage device and the cloud computing environment in response to the cloud computing environment authenticating the user with the cloud computing security credential.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
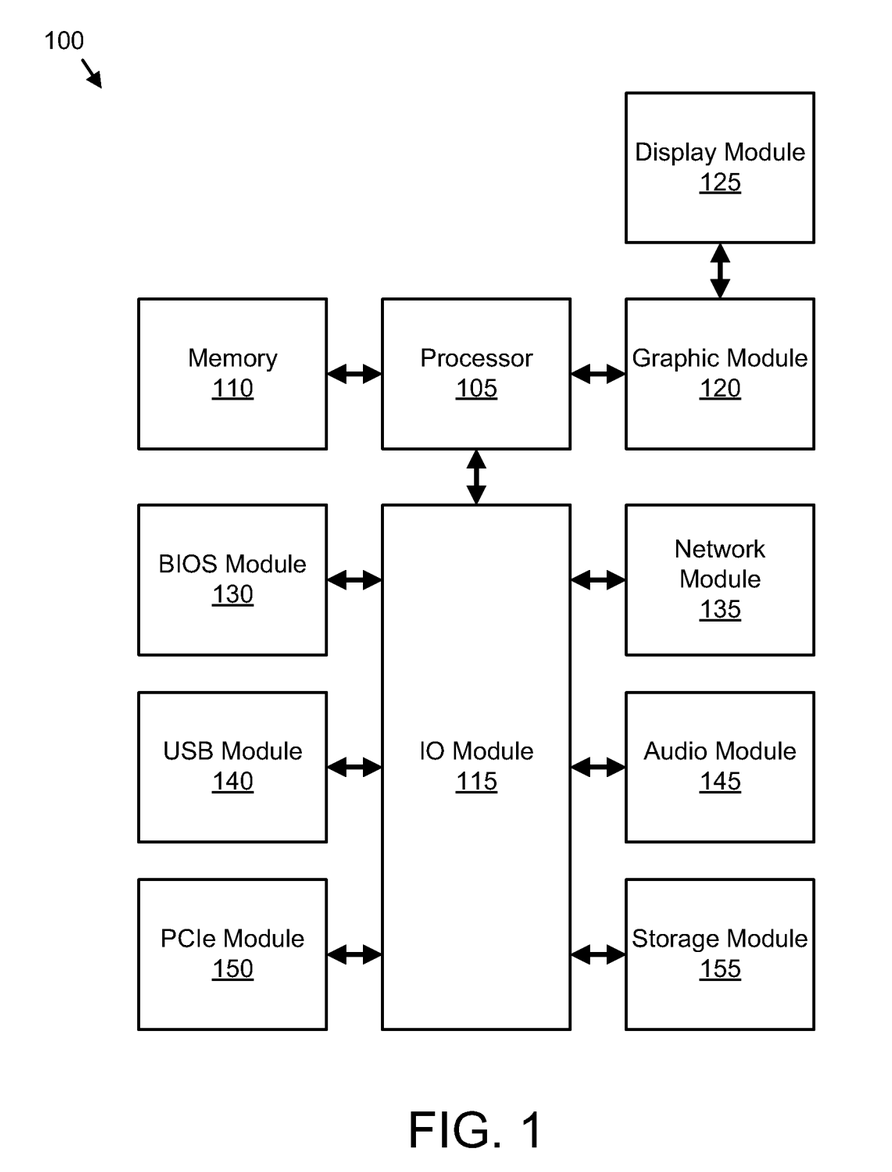
FIG. 1 is a schematic block diagram illustrating one embodiment of a computing device.

FIG. 1 is a schematic block diagram illustrating one embodiment of a computing device 100. The computing device 100 includes a processor 105, a memory 110, an IO module 115, a graphics module 120, a display module 125, a basic input/output system (BIOS) module 130, a network module 135, a universal serial bus (USB) module 140, an audio module 145, a peripheral component interconnect express (PCIe) module 150, and a storage module 155. One of skill in the art will recognize that other configurations of a computing device 100 or multiple computer systems 100 may be employed with the embodiments described herein.

The processor 105, memory 110, IO module 115, graphics module 120, display module 125, BIOS module 130, network module 135, USB module 140, audio module 145, PCIe module 150, and storage module 155, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 110 stores computer readable programs. The processor 105 executes the computer readable programs as is well known to those skilled in the art. The computer readable programs may be tangibly stored in the storage module 155. The storage module 155 may comprise at least one Solid State Device (SSD). In addition, the storage module 155 may include a hard disk drive, an optical storage device, a holographic storage device, a micromechanical storage device, or the like.

The processor 105 may include integrated cache to reduce the average time to access memory 115. The integrated cache may store copies of instructions and data from the most frequently used memory 110 locations. The processor 105 may communicate with the memory 110 and the graphic module 120.

In addition, the processor 105 may communicate with the IO module 115. The IO module 125 may support and communicate with the BIOS module 130, the network module 135, the PCIe module 150, and the storage module 155.

The PCIe module 150 may communicate with the IO module 115 for transferring data or power to peripheral devices. The PCIe module 150 may include a PCIe bus for attaching the peripheral devices. The PCIe bus can logically connect several peripheral devices over the same set of connections. The peripherals may be selected from a printer, a joystick, a scanner, or the like. The PCI module 150 may also comprise an expansion card as is well known to those skilled in the art.

The BIOS module 130 may communicate instructions through the IO module 115 to boot the computing device 100, so that computer readable software instructions stored on the storage module 155 can load, execute, and assume control of the computing device 100. Alternatively, the BIOS module 130 may comprise a coded program embedded on a chipset that recognizes and controls various devices that make up the computing device 100.

The network module 135 may communicate with the IO module 115 to allow the computing device 100 to communicate with other devices over a network. The devices may include routers, bridges, computers, printers, and the like.

The display module 125 may communicate with the graphic module 120 to display information as will be described hereafter. The display module 125 may be a cathode ray tube (CRT), a liquid crystal display (LCD) monitor, or the like.

The USB module 140 may communicate with one or more USB compatible devices over a USB bus. The audio module 145 may generate an audio output.

In one embodiment, each module comprises a computer readable storage medium comprising a computer readable program stored on a tangible storage device.

Figure 2:
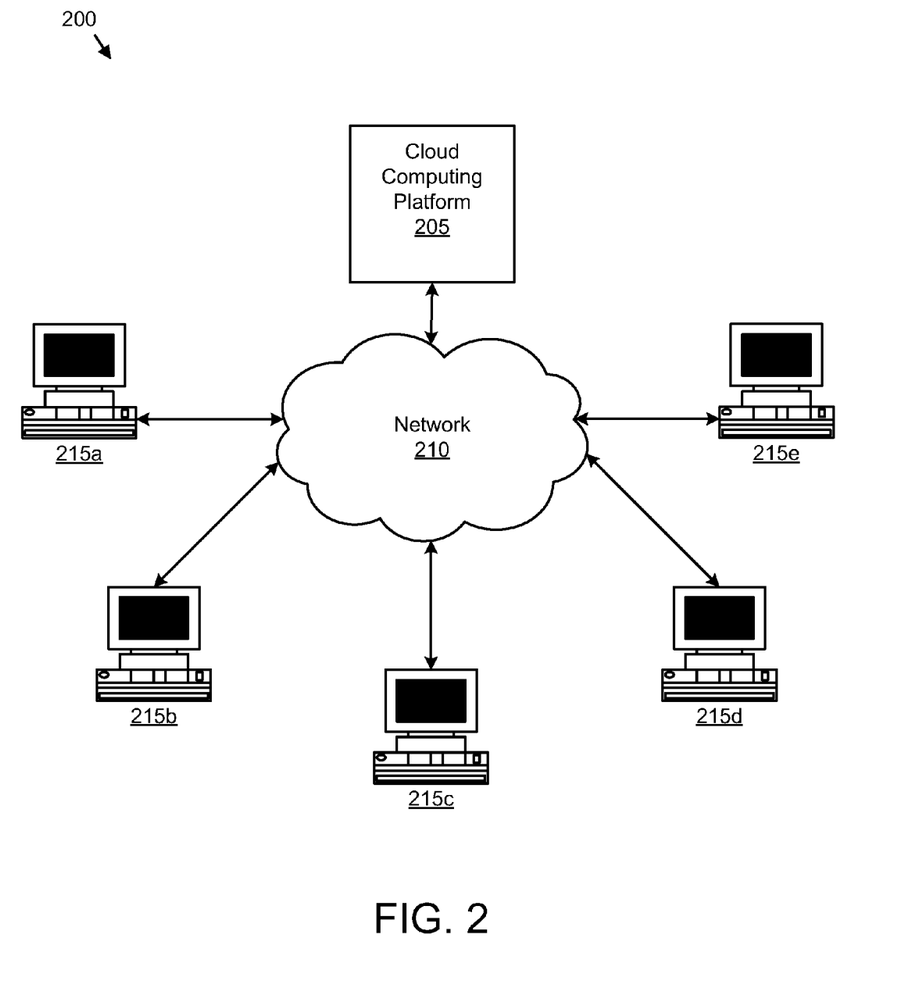
FIG. 2 is a schematic block diagram illustrating one embodiment of cloud computing system.

FIG. 2 depicts one embodiment of a cloud computing system 200. The system 200 includes a cloud computing platform 205, a network 210, and a plurality of cloud access devices 215. The cloud computing platform 205 may host, store, and/or provide applications, documents, and data for on-demand access over the network 210 by the cloud access devices 215. The cloud computing platform 205 may include and/or be implemented by servers, storage, and other infrastructure. The network 210 may comprise a global communications network such as the Internet, a Local Area Network (LAN), multiple LANs communicating over the internet, or any other similar communications network. Each cloud access device 215 may be embodied as a desktop computer, a portable computer, a server, a mainframe computer, a handheld computing device, a touch device, a personal desktop assistant ("PDA"), a tablet computer, an eBook reader, a mobile phone, a Smartphone, and the like. Furthermore, each cloud access device 215 may be in communication with the network 210. A cloud access device 215 may be one embodiment of the computing device 100 depicted in FIG. 1.

Each cloud access device 215 may communicate with the cloud computing platform 205 through the network 210. In one embodiment, a cloud access device 215 communicates with the cloud computing platform 205 with an application, such as an Internet browser, executing on the cloud access device 215. Conventional cloud access devices 215 do not host and/or maintain applications, documents and data from the cloud computing platform 205; a conventional cloud computing platform 205, stateless in operation, provides applications, documents and data to the cloud access devices 215. Consequently, a user may access documents from a first cloud access device 215*a*, and also access the same documents on a second cloud access device 215*b*.

Figure 3:
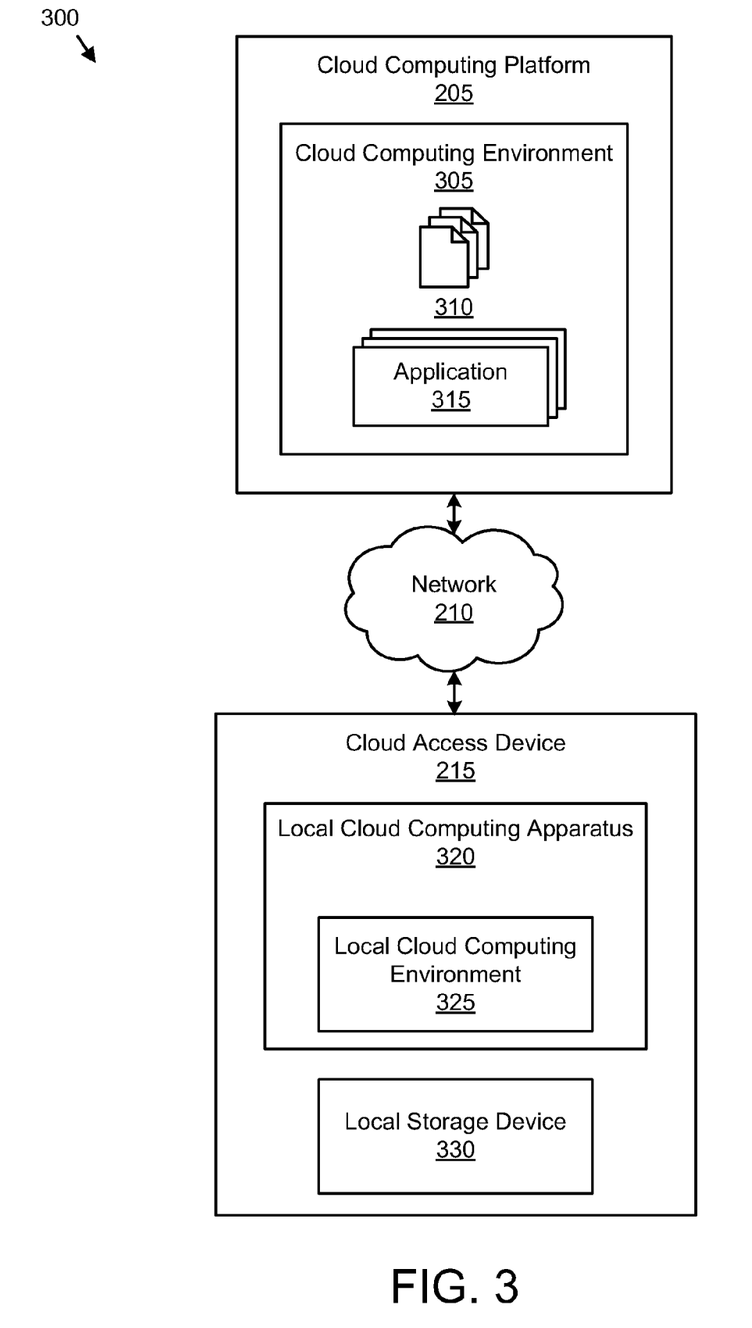
FIG. 3 is a schematic block diagram illustrating one embodiment of a system for a local cloud computing environment.

FIG. 3 depicts one embodiment of a system 300 for a local cloud computing environment. The description of the system 300 refers to elements of FIGS. 1-2, like numbers referring to like elements. The system 300 includes a cloud computing platform 205 that may be substantially similar to the cloud computing platform 205 depicted in FIG. 2. The cloud computing platform 205 includes a cloud computing environment 305 with one or more cloud computing documents 310 and one or more cloud computing applications 315. The cloud computing platform 205 is in communication with a network 210 in communication with a cloud access device 215. The network 210 and the cloud access device 215 may be substantially similar to the similarly numbers elements in FIG. 2. Furthermore, the cloud access device 215 includes a local cloud computing apparatus 320 and a local storage device 330. The local cloud computing apparatus 320 includes a local cloud computing environment 325.

The cloud computing environment 305, also referred to herein as a remote cloud computing environment 305 for differentiation from the local cloud computing environment 325, refers to data, program code, virtual environment, session, and/or applications executing on the cloud computing platform 305 that enable a user and/or application on a cloud access device 215 to access and/or modify applications, programs, and/or data stored and/or hosted by the cloud computing platform 205. The remote cloud computing environment 305 may include one or more cloud computing applications 315, one or more cloud computing documents 310, one or more cloud computing security credentials, and the like. A cloud computing application 315 may include an application hosted by the cloud computing platform 205 for access by a user from a cloud access device 215. For example, a cloud computing application 315 may be a word processing application. A cloud computing document 310 may be a document, file, collection of data, and/or object that a user may access and/or modify. The cloud computing document 310 may be compatible with and/or particular to a cloud computing application 315. Cloud computing security credentials may include various forms of user authorization known in the art including a user name, a password, a security question, and/or the like.

The remote cloud computing environment 305 may be user specific, including cloud computing applications 315 and/or cloud computing documents 310 corresponding to a particular user. The remote cloud computing environment 305, in one embodiment, is accessible by a user by way of one or more cloud computing security credentials. The cloud computing security credentials may be associated with a particular remote cloud computing environment 305 and/or a particular user and/or user account on the cloud computing platform 205. The cloud computing security credentials may allow a user and/or application to access a particular remote cloud computing environment 305. For example, a user may log-in to a particular remote cloud computing environment 305 using cloud computing security credentials associated with the particular remote cloud computing environment 305.

The remote cloud computing environment 305 may be accessible by the cloud access device 215. Furthermore, the remote cloud computing environment 305 may also be accessible by multiple cloud computing access devices 215. For example, a user may log-in to the remote cloud computing environment 305 from a first cloud access device 215*a* (e.g. the user's local computer), modify a cloud computing document 310 in the remote cloud computing environment 305, and then log-in to the remote cloud computing environment 305 from a second cloud access device 215*b* (e.g. the user's work computer) to access the modified cloud computing document 310, without having to transmit the modified cloud computing document 310 from the first cloud access device 215*a* to the second cloud access device 215*b*. However, because the cloud computing platform 205 stores, hosts, and/or operates the remote cloud computing environment 305, when a remote connection (e.g. over the network 210) to the cloud computing platform 205 become unavailable, the user is unable to access, modify, and/or save the user's documents 310, applications 315, and data. Furthermore, a user's modifications to documents 310 and data may be lost if the remote connection fails before the modifications are saved to the remote cloud computing environment 310.

Therefore, in the depicted embodiment, the cloud access device 215 includes a local cloud computing apparatus 320. The local cloud computing apparatus 320 may store cloud computing data from the remote cloud computing environment 305 onto a local storage device 330 in communication with the cloud access device 215. The local cloud computing apparatus 320 may also operate a local cloud computing environment 325 on the cloud access device 215 from the stored cloud computing data. The local cloud computing environment 325 may represent at least a portion of the remote cloud computing environment 305. For example, the local cloud computing environment 325 may include a cloud computing application and a cloud computing document shared by the remote cloud computing environment 305. In one embodiment, the local cloud computing environment 325 includes a runtime instantiation of executable code stored from the cloud computing platform 205. Furthermore, in certain embodiments, the local cloud computing environment 325 is a virtual machine/environment running on the cloud access device 215. In this embodiment, the virtual machine may run over an operating system of the cloud access device 215 and/or run on the cloud access device 215 independent of a base operating system.

The local cloud computing apparatus 320 may operate the local cloud computing environment 325 while the remote connection to the remote cloud computing environment 305 is unavailable. For example, the local cloud computing apparatus 320 may operate the local cloud computing environment 325 while the cloud access device 215 loses a network connection to the network 210, and consequently, to the cloud computing platform 205/remote cloud computing environment 305. The local cloud computing apparatus 320 may therefore allow a user access to cloud computing documents 310 and cloud computing applications 315 when access to the cloud is unavailable. The local cloud computing apparatus 320 may also operate the local cloud computing environment 325 even when access to the cloud is available as described in greater detail below.

In one embodiment, the local cloud computing apparatus 320 maintains and implements a state of the remote cloud computing environment 305 and/or the local cloud computing environment 325. The local cloud computing apparatus 320 may synchronize the local cloud computing environment 325 and the remote cloud computing environment 305 based on the state. Therefore, the local cloud computing apparatus 320 may convey changes made on the local cloud computing environment 325, such as changes made to a cloud computing document 310, to the remote cloud computing environment 305.

In the depicted embodiment, the local cloud computing apparatus 320 resides in the cloud access device 215. In other embodiments, all or a portion of the local cloud computing apparatus 320 may reside outside the cloud access device 215 such as in one or more other devices in communication with the cloud access device 215. In one embodiment, the local cloud computing apparatus 320 is stored on and may be operated from one or more storage devices in communication with the cloud access device 215 such as the local storage device 330.

Figure 4:
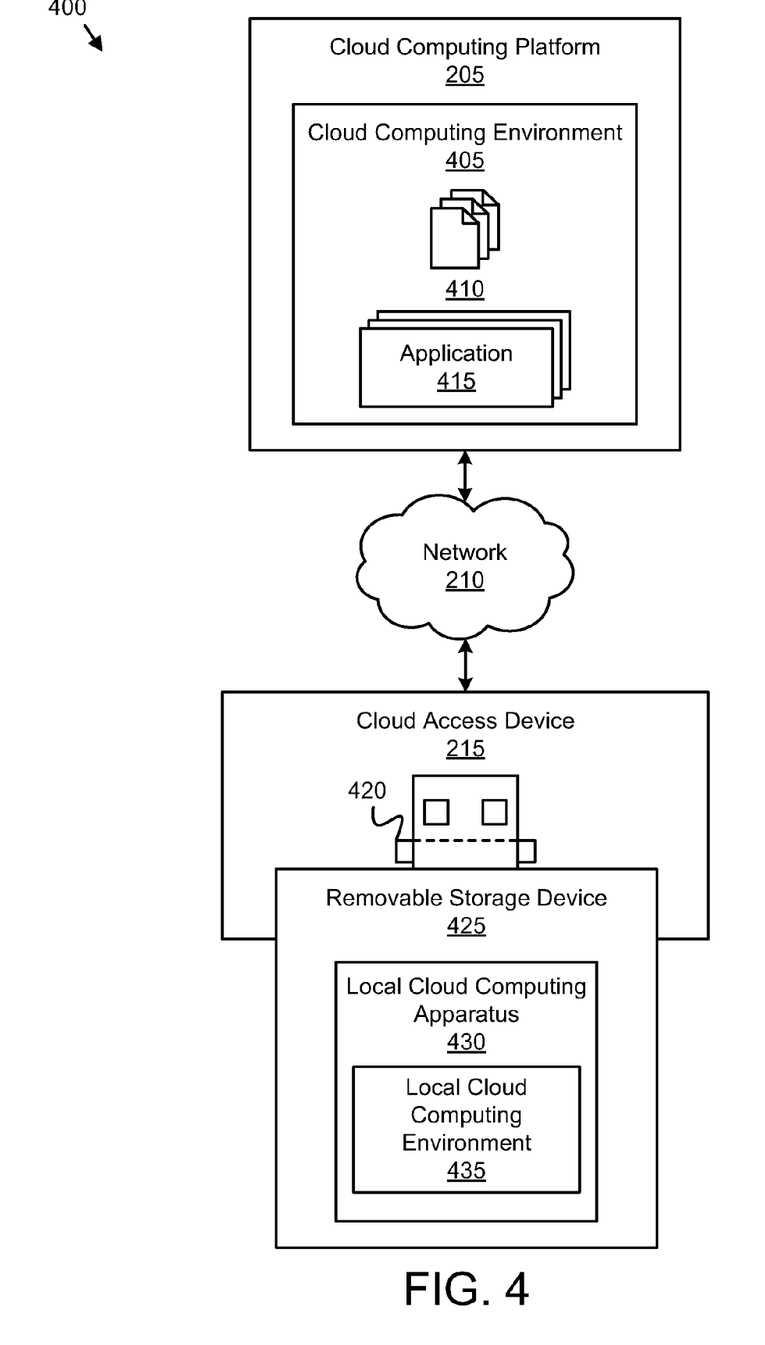
FIG. 4 is a schematic block diagram illustrating another embodiment of a system for a local cloud computing environment.

FIG. 4 illustrates another embodiment of a system 400 for a local cloud computing environment. The description of the system 400 refers to elements of FIGS. 1-2, like numbers referring to like elements. The system 400 includes a cloud computing platform 205, a (remote) cloud computing environment 405 with one or more cloud computing documents 410 and one or more cloud computing applications 415, a network 210, and a cloud access device 215 that may be substantially similar to the like-named elements in FIG. 3. In addition, the cloud access device 215 includes a device port 420. A removable storage device 425 is coupled to the device port 420. The removable storage device 425 includes a local cloud computing apparatus 430 with a local cloud computing environment 435.

The device port 420 may be a port capable of establishing communication between the removable storage device 425 and the cloud access device 215. In one embodiment, the device port 420 is a Universal Serial Bus ("USB") port although any suitable device port/interface may be used. The removable storage device 425 may include a removable Hard Disk Drive ("HDD"), a USB flash memory storage device, and/or any other suitable removable and/or portable storage devices. At least a portion of the local cloud computing apparatus 430 may reside on and/or operate from the removable storage device 425.

The local cloud computing apparatus 430 and the local cloud computing environment 435 may be substantially similar to the like named elements described above in relation to FIG. 3. With the local cloud computing apparatus 430 on the removable storage device 425, a user may transport the local cloud computing environment 435 to various cloud access devices 215. For example, a user may access cloud computing documents 410 and cloud computing applications 415 with the local cloud computing apparatus 430 on a USB flash memory storage device 425 from a first cloud access device 215a (e.g. a home computer), and then take the USB flash memory storage device 425 and connect it to a second cloud access device 215 (e.g. a work computer) to access the cloud computing documents 410 and cloud computing applications 415. In one embodiment, the local cloud computing apparatus 430 includes an auto-run feature that, responsive to connecting with a cloud access device 215, initiates the local cloud computing apparatus 430 and/or automatically logs-in to the remote cloud computing environment 405. Furthermore, as described below, cloud computing documents 410, cloud computing applications 415, and other data may be securely stored on the removable storage device 425 to prevent unwanted access. Sensitive data may be accessible by a user with a security credential corresponding to an associated cloud computing environment. In one embodiment, the security credential matches the security credential corresponding to a user's remote cloud computing environment 305.

Figure 5:
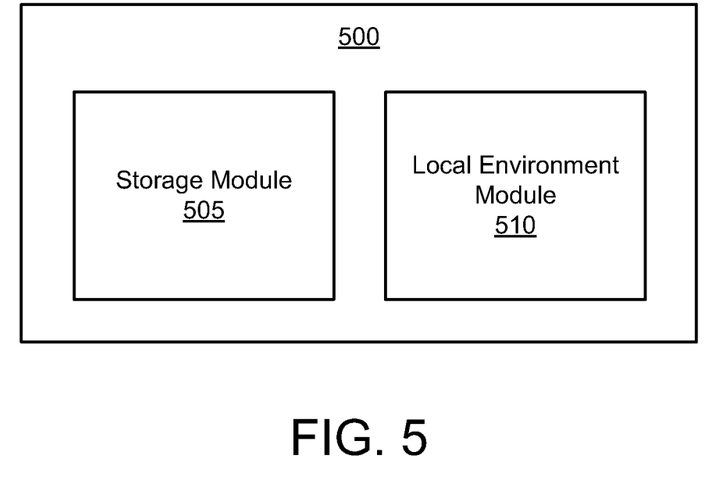
FIG. 5 is a schematic block diagram illustrating one embodiment of an apparatus for a local cloud computing environment.

FIG. 5 is a schematic block diagram illustrating one embodiment of an apparatus 500 for a local cloud computing environment. The apparatus 500 may be one embodiment of the local cloud computing apparatus 320,430 depicted in FIG. 3 and/or FIG. 4. The description of the apparatus 500 refers to elements of FIGS. 1-4, like numbers referring to like elements. The apparatus 500 includes a storage module 505 and a local environment module 410.

The storage module 505 stores cloud computing data from a remote cloud computing environment 305 onto a local storage device 330. Cloud computing data may include, but is not limited to data relating to program code, session information, state information, cloud computing applications 315, cloud computing documents 310, and/or cloud computing security credentials. For example, the cloud computing data may include executable code that a browser on the cloud access device 215 may use to access cloud computing applications 315 and cloud computing documents 310. The cloud computing data may include data to replicate at least a portion of the remote cloud computing environment 305 onto the local storage device 330, including, in one embodiment, data sufficient to simulate, for a user, the appearance and control of accessing cloud computing applications 315 and cloud computing documents 310 of the remote cloud computing environment 305.

The storage module 505 may communicate with the remote cloud computing environment 305 through a remote connection and the storage module 505 downloads the cloud computing data from the cloud computing platform 205 through the remote connection. In one embodiment, the storage module 505 accesses cloud computing data by way of function calls, using, for example, an application programming interface ("API"). Furthermore, the storage module 505 may also access the cloud computing data using industry standard protocols such as Transmission Control Protocol/Internet Protocol ("TCP/IP"), Hypertext Markup Language ("HTML"), Extended Markup Language ("XML"), and the like. In certain embodiments, the storage module 505 works with conventional cloud computing platforms 205 and/or remote cloud computing environments 305, downloading cloud computing data through existing function calls. In another embodiment, the cloud computing platform 205 and/or remote cloud computing environment 305 is configured to interface with the storage module 505 to allow the storage module 505 to download the cloud computing data. In one embodiment, the storage module 505 downloads a minimum amount of cloud computing data to enable a user to access a particular cloud computing document 310 and/or cloud computing application 315. The storage module 505 may download additional cloud computing data in an "as needed" basis as the user selects un-downloaded applications 315, documents 310, and/or features.

The remote connection may include the network 210 (e.g. the Internet) a communication from the cloud access device 215 to the network 210, a communication between the network 210 and the cloud computing platform 205, and/or the like. Furthermore, as described above in relation to FIG. 4, in one embodiment, at least a portion of the local storage device 330 is a removable storage device 405.

In one embodiment, the storage module 505 maintains a secure storage area on the local storage device 330. The storage module 505 may securely store at least a portion of the cloud computing data on the secure storage area. For example, the storage module 505 may store user-specific data such as a user's cloud computing documents 310 on the secure storage area. In addition a particular portion of the at least a portion of the cloud computing data may be accessible by a user with a security credential corresponding to the particular portion. In one embodiment, the security credential matches the security credential corresponding to a user's remote cloud computing environment 305.

The local environment module 510 operates a local cloud computing environment 325 from the local storage device 330. The local environment module 510 may replicate at least a portion of the remote cloud computing environment 305. Replicating the remote cloud computing environment 305 may include operating the local cloud computing environment 325 from actual executable code used for the remote cloud computing environment 305 by the cloud computing platform 205. In one embodiment, replicating the remote cloud computing environment 305 includes simulating the remote cloud computing environment 305 with at least a portion of executable code that does not originate from the cloud computing platform 205/cloud computing environment 305. In addition, the local environment module 510 may operate the local cloud computing environment 325 from the stored cloud computing data, such as application data, document data, and/or cloud computing operational data (e.g. code to run the could computing environment) as is described above. The local environment module 510 may execute cloud computing code that a browser on the cloud access device 215 may use to access cloud computing applications 315 and cloud computing documents 310 to simulate and/or replicate access to the remote cloud computing environment 305.

Furthermore, the local environment module 510 may operate the local cloud computing environment 325 from the local storage device 330 while the remote connection to the remote cloud computing environment 305 is unavailable. In one embodiment, the local environment module 510 operates the local cloud computing environment 325 even when the remote connection has data connectivity. In this embodiment, the local environment module 510 may allow a user to access and work from the local cloud computing environment 325, uploading changes and updates to the remote cloud computing environment 305 at predetermined intervals. In one embodiment, the local environment module 510 operates the local cloud computing environment 325 in response to the remote connection being unavailable. In this embodiment, the local environment module 510 may allow a user to access and work from the remote cloud computing environment 305 when the remote connection has data connectivity. In one embodiment, the local environment module 510 operates the local cloud computing environment 325 as a virtual machine/environment running on the cloud access device 215.

Figure 6:
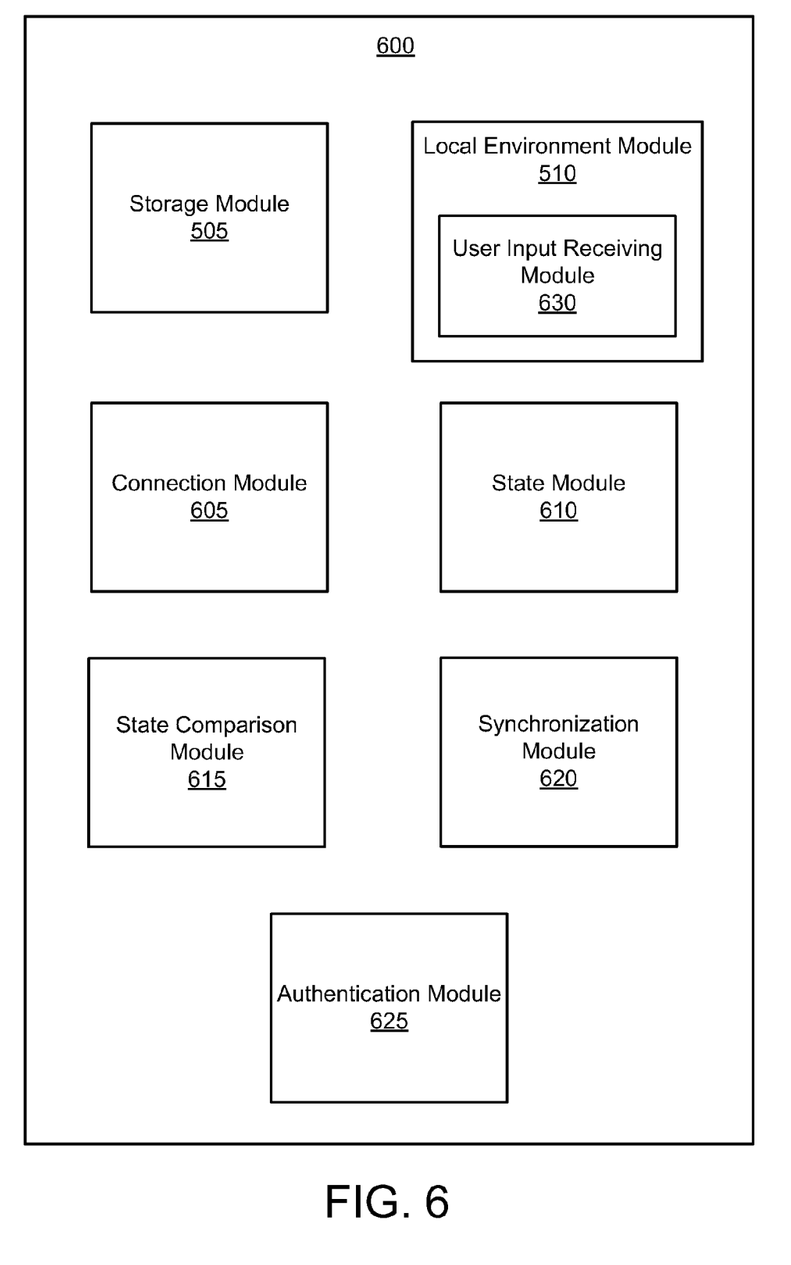
FIG. 6 is a detailed schematic block diagram illustrating another embodiment of an apparatus for a local cloud computing environment.

FIG. 6 is a detailed schematic block diagram illustrating another embodiment of an apparatus 600 for a local cloud computing environment 325. The apparatus 600 may be one embodiment of the local cloud computing apparatus 320,430 depicted in FIG. 3 and/or FIG. 4. The description of the apparatus 600 refers to elements of FIGS. 1-4, like numbers referring to like elements. The apparatus 600 includes the storage module 505 and the local environment module 510, wherein these modules include substantially the same features as described in relation to FIG. 5. In addition, the local environment module 510 includes a user input receiving module 630 and the apparatus 600 further includes a connection module 605, a state module 610, a state comparison module 615, a synchronization module 620, and an authentication module 625.

The connection module 605 checks for data connectivity of the remote connection at a predetermined interval and may detect data connectivity of the remote connection. In one embodiment, the connection module 605 continually "pings" the cloud computing platform 205 (e.g. a gateway and/or Internet Protocol address associated with the cloud computing platform 205) as is known the in art. When the connection module 605 fails to receive a response, the connection module 605 may detect no data connectivity of the remote connection. Likewise, as the connection module 605 receives replies to its pings, the connection module 605 may detect data connectivity of the remote connection. In one embodiment, the connection module 605 pings the cloud computing platform 205 at a predetermined interval. The cloud connection module 605 may also check for data connectivity in response to a predetermined event such as a user input, a change in user input, and the like.

The state module 610 maintains a state of the remote cloud computing environment 305 and/or the local cloud computing environment 325. The state may include a cloud computing environment version indicator, an application version indicator, a document version indicator, a security credential state indicator, and/or the like. The state module 610 may determine a state based on a user update of a cloud computing document 310 on the local cloud computing environment 325. For example, a user may edit a document and the local environment module 510 may save the changes. The state module 610 may then increment a document version number or other state indicator to indicate that the document is a later version. Furthermore, the state module 610 may also maintain a state of one or more cloud computing applications 315. For example, the state module 610 may determine that a version of a particular word processing application 315 on the local cloud computing environment 325 is version 2.

The state module 610 may maintain states based on states and/or indicators assigned and used by the cloud computing platform 205. For example, the state module 610 may reference, access, and/or modify a state indicator associated with a particular cloud computing document 310, cloud computing application 315, cloud computing environment, and the like. For example, the state module 610 may refer to a version number for a particular cloud computing application 315. In another embodiment, the state module 610 determines a state and does not use a pre-existing state indicator. For example, the state module 610 may determine the state of a cloud computing document 310 based on a modification date of the cloud computing document 310 and/or other metadata associated with the cloud computing document 310. If a version of the cloud computing document 310 on the remote cloud computing environment 305 has a modification date that is more recent than a version of the same cloud computing document 310 on the local cloud computing environment 325, the state module 610 may assign the remote cloud computing document 310 a state indicator indicating a more recent state.

The state module 610 may store a state for components related to the remote cloud computing environment 305 (such as code related to the remote cloud computing environment 305 itself, cloud computing documents 310 on the remote cloud computing environment 305, remote cloud computing applications 315, and the like) and for components related to the local cloud computing environment 325.

The state comparison module 615 compares a state of the remote cloud computing environment 305 with a state of the local cloud computing environment 325 to determine differences between the remote cloud computing environment 305 and the local cloud computing environment 325. Comparing a state of the cloud computing environments 305,325 (remote and/or local) may include comparing a state of the cloud computing environment (e.g. executable code of the environment itself), cloud computing applications 315, cloud computing documents 310, and the like. The state comparison module 615 may signal the synchronization module 620 to synchronize the remote cloud computing environment 305 and/or the local cloud computing environment 325 if the state comparison module 615 determines differences.

The synchronization module 620 synchronizes differences of one or more of the remote cloud computing environment 305 and the local cloud computing environment 325. The synchronization module 620 may synchronize either cloud computing environment 305,325 in response to the connection module 605 detecting data connectivity of the remote connection and/or in response to the state comparison module 615 detecting differences between the cloud computing environments 305,325. Synchronizing may include copying data from the remote cloud computing environment 305 to the local cloud computing environment 325 and/or copying data from the local cloud computing environment 325 to the remote cloud computing environment 305. For example, if a particular cloud computing document 310 on the remote cloud computing environment 305 has a more recent state than a copy of the particular cloud computing document 310 on the local cloud computing environment 325, the synchronization module 620 may copy the particular cloud computing document 310 (entirely or an updated portion of the document) from the remote cloud computing environment 305 to the local cloud computing environment 325. In certain embodiments, the synchronization module 620 may follow certain rules regarding synchronization. For example, rules may specify which portions of cloud computing environment data can be synchronized, and in which direction synchronization may occur. For example, the rules may specify that a cloud computing document 310 may be synchronized in both directions, but that cloud computing applications 315 may only be synchronized from the remote cloud computing environment 305 to the local cloud computing environment 325 (minimizing the uploading of a virus in a cloud computing application 315, for example).

The authentication module 625 may provide the remote cloud computing environment 305 with a cloud computing security credential corresponding to a user. As a result, the remote cloud computing environment 305 may allow communication between the local storage device 330 and the remote cloud computing environment 305 in response to authenticating the user with the cloud computing security credential. Cloud computing security credentials may include various forms of user authorization known in the art including a user name, a password, a security question, and/or the like. In one embodiment, the authentication module 625 queries a user for the user's cloud computing security credentials to log-in to a particular remote cloud computing environment 305 for the user.

The user input receiving module 630 may receive user input in the local cloud computing environment 325. For example, user input may include text input received from a user through a keyboard. The user input receiving module 630 update a particular cloud computing document 310 in the local cloud computing environment 325 with the received user input and signal the state module 610 to update the state of the particular cloud computing document 310.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
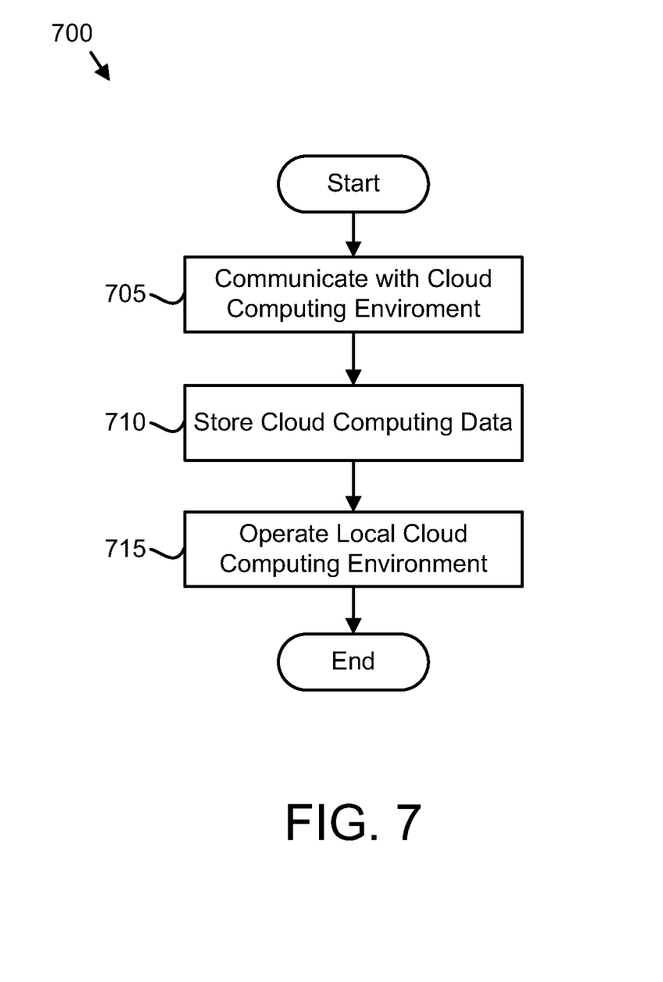
FIG. 7 is a schematic flow chart diagram illustrating one embodiment of a method for a local cloud computing environment.

FIG. 7 is a schematic flow chart diagram illustrating one embodiment of a method 700 for a local cloud computing environment 325. The method 700 substantially includes the steps to carry out the functions presented above with respect to the operation of the described apparatus and system of FIGS. 1-5. The description of the method 700 refers to elements of FIGS. 1-5, like numbers referring to like elements.

In one embodiment, the method 700 is implemented with a computer readable storage medium comprising a computer readable program stored on a tangible memory device and/or storage device. The computer readable storage medium may be integrated into a computer system, such as the computing device 100, wherein the computer readable program executed by the processor 105 performs the method 700.

The method 700 starts and the storage module 505 communicates 705 with a cloud computing environment 305 through a remote connection. Then, the storage module 505 stores 710 cloud computing data from the cloud computing environment 305 onto a local storage device 330. Next, the local environment module 510 operates 715 a local cloud computing environment 325 from the local storage device 330 while the remote connection to the cloud computing environment 305 is unavailable. The local cloud computing environment 325 replicates at least a portion of the cloud computing environment 305 and is operated from the stored cloud computing data. Then, the method 700 ends.

Figure 8:
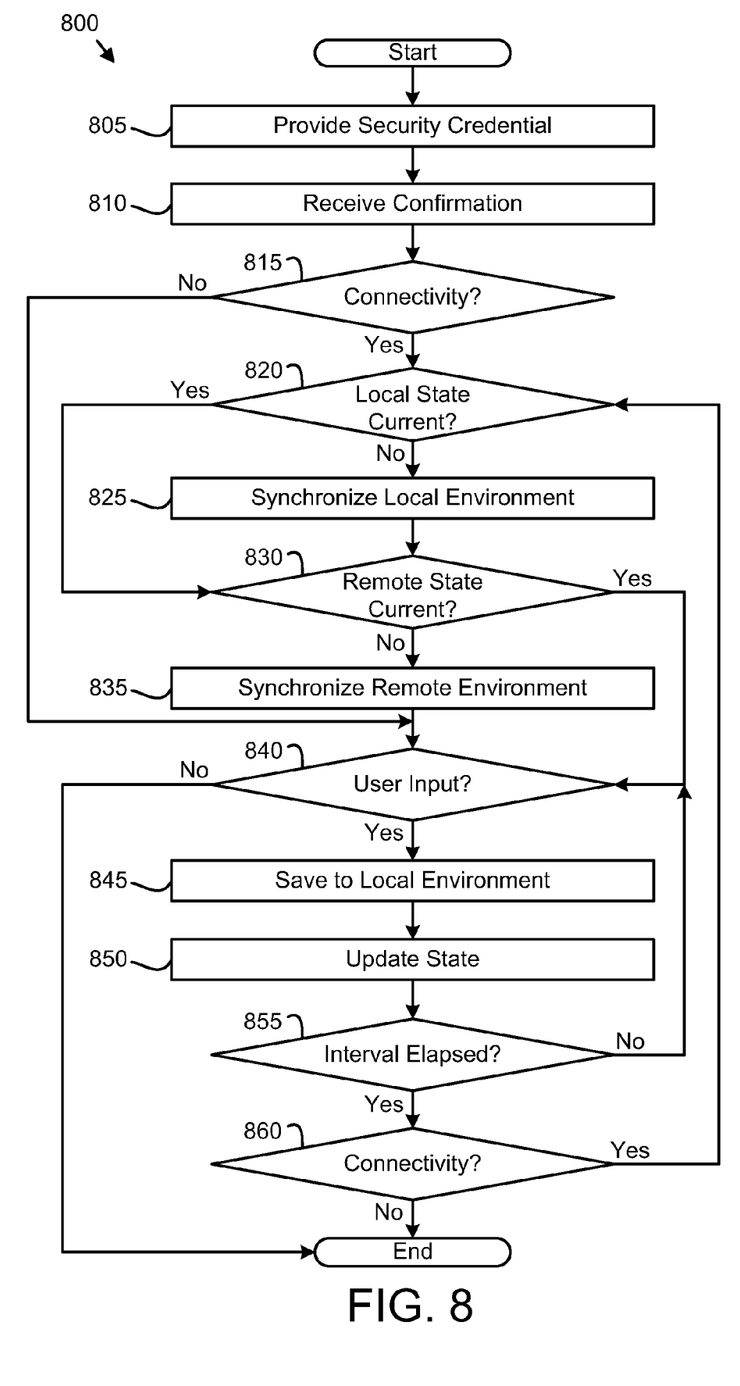
FIG. 8 is a detailed schematic flow chart diagram another embodiment of a method for a local cloud computing environment.

FIG. 8 is a detailed schematic flow chart diagram illustrating yet another embodiment of a method 800 for a local cloud computing environment 325. The method 800 substantially includes the steps to carry out the functions presented above with respect to the operation of the described apparatus and system of FIGS. 1-6. The description of the method 800 refers to elements of FIGS. 1-6, like numbers referring to like elements.

In one embodiment, the method 800 is implemented with a computer readable storage medium comprising a computer readable program stored on a tangible memory device and/or storage device. The computer readable storage medium may be integrated into a computer system, such as the computing device 100, wherein the computer readable program executed by the processor 105 performs the method 800.

The method 800 starts and the authentication module 625 provides 805 a user's cloud computing security credential to a local cloud computing environment 305. The authentication module 625 then receives 810 a confirmation from the local cloud computing environment 305. The confirmation may include an indication of a positive authentication from the local cloud computing environment 305, an indication of an established connection, ability to access data from the local cloud computing environment 305, receiving data from the local cloud computing environment 305, and the like. Note that in certain embodiments, the authentication module may initially log-in to the remote cloud computing environment 305.

The connection module 605 then checks 815 for data connectivity of the remote connection to the remote cloud computing environment 305. In one condition, the connection module 605 fails to detect 815 data connectivity and the method 800 proceeds to user input receiving module 630 monitoring 840 for user input as is described below (postponing synchronization). Alternatively, the connection module 605 detects 815 data connectivity of the remote connection.

The state comparison module 615 then determines 820 a condition of whether a state of a local cloud computing environment 325 is current. The state comparison module 615 may compare a state of the remote cloud computing environment 305 with the state of the local cloud computing environment 325 to determine 820 whether the state of the local cloud computing environment 325 is current. The state may include a cloud computing environment version indicator, an application version indicator, and a document version indicator of the local cloud computing environment 325, one or more applications in the local cloud computing environment 325, documents in the local cloud computing environment 325, and the like.

The state comparison module 615 may determine 820 that the state of the local cloud computing environment 325 is not current. The synchronization module 620 then synchronizes 825 differences between the local cloud computing environment 325 and the remote cloud computing environment 305. For example, the synchronization module 620 may update a particular document 310 of the local cloud computing environment 325 based on a newer version of the particular document 310 stored on the remote cloud computing environment. Returning to step 820, the state comparison module 615 may also determine 820 that the state of the local cloud computing environment 325 is current.

Continuing with step 830, the state comparison module 615 then determines 830 a condition of whether the state of the remote cloud computing environment 305 is current. Specifically, the state comparison module 615 may compare a state of the remote cloud computing environment 305 with the state of the local cloud computing environment 325 to determine 830 whether the state of the remote cloud computing environment 305 is current. As with the local cloud computing environment 325, the state may include a cloud computing environment version indicator, an application version indicator, and a document version indicator of the remote cloud computing environment 305, one or more cloud computing applications 315 in the remote cloud computing environment 305, one or more cloud computing documents 310 in the remote cloud computing environment 305, and the like.

In one condition, the state comparison module 615 determines 830 that the state of the remote cloud computing environment 305 is not current. The synchronization module 620 then synchronizes 835 the remote cloud computing environment 305 with the local cloud computing environment 325. For example, the synchronization module 620 may update a particular cloud computing document 310 of the remote cloud computing environment 305 based on a newer version of the particular cloud computing document 310 stored on the local cloud computing environment 325. Returning to step 830, the state comparison module 615 may also determine 830 that the state of the remote cloud computing environment 305 is current.

Continuing with step 840, the user input receiving module 630 may receive 840 user input. In one condition, the user input receiving module 630 does not receive 840 user input and the method 800 ends. Alternatively, the user input module receives 840 user input. Next, the local environment module 510 saves 845 the user input to the local cloud computing environment 325. For example, the local environment module 510 may save user input to a cloud computing document 310 stored in the local cloud computing environment 325. The state module 610 then updates 850 the state of the local cloud computing environment 325 to reflect the changes in the local cloud computing environment 325. For example, if the local environment module 510 updated a document, the state module 610 may increment a version number of the cloud computing document 310.

Next, the connection module 605 determines 855 whether a predetermined interval has elapsed for checking connectivity to the remote cloud computing environment 305. In one condition, the connection module 605 determines 855 that the predetermined interval has not elapsed and the method 800 returns to step 840 in which the user input receiving module 630 determines 840 whether user input is received. Alternatively, the connection module 605 determines 855 that the predetermined interval has elapsed. The connection module 605 then checks 860 for data connectivity of the remote connection to the remote cloud computing environment 305. In one condition, the connection module 605 detects 860 data connectivity of the remote connection and the method 800 returns, beginning in step 820, to the state comparison module 615 determining 820 whether the states of the local cloud computing environment 325 and the remote cloud computing environment 305 are current. The method 800 may continue from step 820, checking 820 the state of the local cloud computing environment 325 and the remote cloud computing environment 305. In step 835, the synchronization module 620 may synchronize 835 a copy of the document 310 in the remote cloud computing environment 305 with the modified document 310 in the local cloud computing environment 325.

Referring back to step 860, the connection module 605 may not detect 860 data connectivity of the remote connection. Then, the method 800 ends.

Embodiments may be practiced in other specific forms. The described embodiments are to be considered in all respects only as illustrative and not restrictive. The scope of the invention is, therefore, indicated by the appended claims

What is claimed is:
What is claimed is:

1. An apparatus comprising:
a storage module storing cloud computing data from a cloud computing environment onto a local storage device in anticipation of the cloud computing environment becoming unavailable, the storage module communicating with the cloud computing environment through a remote connection, the storage module receiving the cloud computing data from the cloud computing environment, the cloud computing data comprising executable code and additional data to simulate a connection to an application of the cloud computing environment;
a local environment module operating a local cloud computing environment from the local storage device by executing the executable code to simulate the connection to the application of the cloud computing environment in response to the cloud computing environment being unavailable, the local cloud computing environment operated from the stored cloud computing data;
a state module maintaining a state of one or more of the cloud computing environment and the local cloud computing environment;
a connection module checking for data connectivity of the remote connection at a predetermined interval;
a state comparison module comparing a state of the cloud computing environment with a state of the local cloud computing environment to determine differences between the cloud computing environment and the local cloud computing environment; and
a synchronization module synchronizing differences of one or more of the cloud computing environment and the local cloud computing environment in response to the connection module detecting data connectivity of the remote connection and the state comparison module detecting a difference between the cloud computing environment and the local cloud computing environment, wherein
synchronizing differences of one or more of the cloud computing environment and the local cloud computing environment comprises limiting the synchronization of cloud computing applications from the remote cloud environment to the local cloud environment only.

2. The apparatus of claim 1, wherein an application of the local cloud computing environment communicates with a simulated application of the cloud computing environment using function calls.

3. The apparatus of claim 1, wherein the state comprises one or more of a cloud computing environment version indicator, an application version indicator, and a document version indicator of one or more of the cloud computing environment and the local cloud computing environment.

4. The apparatus of claim 1, wherein the storage module maintains a secure storage area on the local storage device, the storage module securely storing at least a portion of the cloud computing data on the secure storage area, a particular portion of the at least a portion of the cloud computing data accessible by a user with a security credential corresponding to the particular portion.

5. The apparatus of claim 1, wherein the cloud computing environment comprises cloud computing security credentials.

6. A method performed by a local computing device, the method comprising:
communicating with a cloud computing environment through a remote connection;
storing cloud computing data from the cloud computing environment onto a local storage device in anticipation of the cloud computing environment becoming unavailable, the cloud computing data originating at the cloud computing environment, the cloud computing data comprising executable code and additional data to simulate an application of the cloud computing environment;
maintaining a state of one or more of the cloud computing environment and the local cloud computing environment;
operating a local cloud computing environment from the local storage device by executing the executable code to simulate the application of the cloud computing environment in response to the cloud computing environment becoming unavailable, the local cloud computing environment operated from the stored cloud computing data;
checking for data connectivity of the remote connection at a predetermined interval;
comparing a state of the cloud computing environment with a state of the local cloud computing environment to determine differences between the cloud computing environment and the local cloud computing environment; and
synchronizing differences of one or more of the cloud computing environment and the local cloud computing environment in response to detecting data connectivity of the remote connection and detecting a difference between the cloud computing environment and the local cloud computing environment, wherein
synchronizing differences of one or more of the cloud computing environment and the local cloud computing environment comprises limiting the synchronization of cloud computing applications from the remote cloud environment to the local cloud environment only.

7. The method of claim 6, wherein an application of the local cloud computing environment communicates with a simulated application of the cloud computing environment using function calls.

8. The method of claim 6, wherein the state comprises one or more of a cloud computing environment version indicator, an application version indicator, and a document version indicator of one or more of the cloud computing environment and the local cloud computing environment.

9. The method of claim 6, further comprising maintaining a secure storage area on the local storage device, wherein maintaining the secure storage area on the local storage device further comprises storing at least a portion of the cloud computing data on the secure storage area, a particular portion of the at least a portion of the cloud computing data accessible by a user with a security credential corresponding to the particular portion.

10. The method of claim 6, wherein the cloud computing environment comprises cloud computing security credentials.

11. A computer program product to perform operations at a computing device, the computer program product comprising a storage device storing computer usable program code executable to perform operations comprising:
communicating with a cloud computing environment through a remote connection;

storing cloud computing data from the cloud computing environment onto a local removable storage device in anticipation of the cloud computing environment becoming unavailable, the cloud computing data originating at the cloud computing environment, the cloud computing data comprising executable code and additional data to simulate an application of the cloud computing environment;

operating a local cloud computing environment from the local storage device by executing the executable code to simulate the application of the cloud computing environment while the remote connection to the cloud computing environment is unavailable, the local cloud computing environment replicating at least a portion of the functionality of the application of the cloud computing environment and operated from the stored cloud computing data;

maintaining a state of one or more of the cloud computing environment and the local cloud computing environment;

checking for data connectivity of the remote connection at a predetermined interval;

comparing a state of the cloud computing environment with a state of the local cloud computing environment to determine differences between the cloud computing environment and the local cloud computing environment; and synchronizing differences of one or more of the cloud computing environment and the local cloud computing environment in response to detecting data connectivity of the remote connection and detecting a difference between the cloud computing environment and the local cloud computing environment, wherein synchronizing differences of one or more of the cloud computing environment and the local cloud computing environment comprises limiting the synchronization of cloud computing applications from the remote cloud environment to the local cloud environment only.

12. The computer program product of claim 11, wherein the state comprises one or more of a cloud computing environment version indicator, an application version indicator, and a document version indicator of one or more of the cloud computing environment and the local cloud computing environment.

13. The computer program product of claim 11, further comprising providing the cloud computing environment with a cloud computing security credential corresponding to a user, the cloud computing environment allowing communication between the local storage device and the cloud computing environment in response to the cloud computing environment authenticating the user with the cloud computing security credential.

\* \* \* \* \*